(12) United States Patent
Kim et al.

(10) Patent No.: US 12,363,325 B2
(45) Date of Patent: Jul. 15, 2025

(54) METHOD AND APPARATUS FOR IMAGE ENCODING, AND METHOD AND APPARATUS FOR IMAGE DECODING

(71) Applicants: Electronics and Telecommunications Research Institute, Daejeon (KR); KOOKMIN UNIVERSITY INDUSTRY ACADEMY COOPERATION FOUNDATION, Seoul (KR)

(72) Inventors: Sung Hoon Kim, Daejeon (KR); Seong Won Jung, Daejeon (KR); Dong Wook Kang, Daejeon (KR); Kyeong Hoon Jung, Daejeon (KR); Seung Jun Lee, Daejeon (KR); Ju Hyeon Lee, Daejeon (KR)

(73) Assignees: ELECTRONICS AND TELECOMMUNICATIONS RESEARCH INSTITUTE, Daejeon (KR); KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 90 days.

(21) Appl. No.: 18/495,504

(22) Filed: Oct. 26, 2023

(65) Prior Publication Data
US 2024/0163462 A1 May 16, 2024

(30) Foreign Application Priority Data

Oct. 26, 2022 (KR) .................. 10-2022-0139695
Aug. 2, 2023 (KR) .................. 10-2023-0101304

(51) Int. Cl.
*H04N 19/30* (2014.01)
*H04N 19/597* (2014.01)

(52) U.S. Cl.
CPC ........... *H04N 19/30* (2014.11); *H04N 19/597* (2014.11)

(58) Field of Classification Search
CPC ............................. H04N 19/30; H04N 19/597
(Continued)

(56) References Cited

U.S. PATENT DOCUMENTS

| 9,288,466 B2 | 3/2016 | Kim et al. |
| 10,735,752 B2 | 8/2020 | Kang et al. |

(Continued)

FOREIGN PATENT DOCUMENTS

| KR | 10-2012-0051574 | 5/2012 |
| KR | 10-2012-0096317 | 8/2012 |

(Continued)

OTHER PUBLICATIONS

Dong Wook Kang et al., "Hybrid 3DTV Systems Based on the Cross-View SHVC", JBE vol. 23, No. 2, pp. 316-319 (Feb. 2, 2018).

*Primary Examiner* — Tung T Vo
(74) *Attorney, Agent, or Firm* — KILE PARK REED & HOUTTEMAN PLLC (57) ABSTRACT

Provided is an apparatus for image encoding, the apparatus including: a transmitter memory configured to store a program for encoding a stereoscopic 3D image; and an encoding processor configured to execute the program stored in the transmitter memory, wherein the encoding processor is configured to: generate a first stream and a second stream from a left image and a down-converted right image, decode the first stream and the second stream to generate a decoded left image and a first decoded right image; generate a third stream from the decoded left image, the first decoded right image, and an original right image, and decode the third stream to generate a second decoded right image; and (Continued)

generate a fourth stream from the second decoded right image and the original right image.

18 Claims, 8 Drawing Sheets

(58) Field of Classification Search
  USPC .................................................. 375/240.21
  See application file for complete search history.

(56) References Cited

U.S. PATENT DOCUMENTS

| | | | |
|---|---|---|---|
| 11,363,281 B2 | 6/2022 | Minoo et al. | |
| 11,412,240 B2 | 8/2022 | Lee et al. | |
| 2012/0212578 A1 | 8/2012 | Lee et al. | |
| 2012/0300843 A1* | 11/2012 | Horlander | H04N 19/176 375/E7.243 |
| 2014/0286397 A1* | 9/2014 | Chen | H04N 13/194 375/240.02 |
| 2014/0286415 A1* | 9/2014 | Kang | H04N 19/36 375/240.12 |
| 2014/0355693 A1* | 12/2014 | Chen | H04N 19/597 375/240.26 |
| 2015/0110172 A1* | 4/2015 | Ye | H04N 19/33 375/240.02 |
| 2015/0124888 A1* | 5/2015 | Hwang | H04N 21/6336 375/240.26 |
| 2016/0150237 A1* | 5/2016 | Kim | H04N 19/187 375/240.02 |
| 2016/0234526 A1 | 8/2016 | Wang et al. | |

FOREIGN PATENT DOCUMENTS

| | | |
|---|---|---|
| KR | 10-2017-0115060 | 10/2017 |
| KR | 10-2468223 | 11/2022 |

* cited by examiner

METHOD AND APPARATUS FOR IMAGE ENCODING, AND METHOD AND APPARATUS FOR IMAGE DECODING

CROSS-REFERENCE TO RELATED APPLICATION

This application claims priority to and the benefit of Korean Patent Application No. 10-2022-0139695, filed on Oct. 26, 2022 and Korean Patent Application No. 10-2023-0101304, filed on Aug. 2, 2023, which are hereby incorporated by reference for all purposes as if set forth herein.

BACKGROUND

1. Field of the Invention

The present invention relates to a method and apparatus for image encoding, and a method and apparatus for image decoding method.

2. Discussion of Related Art

In general, a stereoscopic three-dimensional (S3D) image is composed of a pair of left and right images obtained by photographing the same subject by a left camera and a right camera spaced a certain distance from each other.

As 3D images have recently been widely used in various visual media, there is an increasing demand for technology for synthesizing 3D images with other 3D images or graphics.

When providing a converged stereoscopic 3D image service, asymmetry in image quality between both eyes causes discomfort to viewers. In this case, when the difference in image quality between both eyes falls within a certain critical range, viewing discomfort disappears, so it is required to narrow the difference between the two image qualities to the critical range.

To address the asymmetry in image quality between the left and right images, cross-view scalable high efficiency video coding (SHVC) and video enhancement information (VEI) encoding technologies have been proposed, and the gap in image quality between binocular images has been reduced, but symmetry has still not been achieved.

SHVC encoding is a method of encoding by receiving inputs of a base layer (BL) and an enhancement layer (EL). In this case, since the resolution of the BL is upscaled to match that of the EL, and then the residual signals of the BL and the EL are encoded, the encoding of the EL is significantly influenced by the image quality of the BL, which is directly related to the amount of bitrate to be allocated.

The background technology of the present invention is disclosed in Korean Unexamined Patent Publication No. 10-2012-0096317 (Aug. 30, 2012) titled "A method and apparatus for encoding a stereoscopic video."

SUMMARY OF THE INVENTION

The present invention is directed to improving the image quality of a reference image by encoding two enhancement layers (ELs) through a single base layer (BL).

According to an aspect of the present invention, there is provided an apparatus for image encoding, the apparatus including: a transmitter memory configured to store a program for encoding a stereoscopic 3D image; and an encoding processor configured to execute the program stored in the transmitter memory, wherein the encoding processor is configured to: generate a first stream and a second stream from a left image and a down-converted right image, decode the first stream and the second stream to generate a decoded left image and a first decoded right image; generate a third stream from the decoded left image, the first decoded right image, and an original right image, and decode the third stream to generate a second decoded right image; and generate a fourth stream from the second decoded right image and the original right image.

The encoding processor may be configured to perform scalable high efficiency video coding (SHVC) encoding on an input of the left image and the down-converted right image to generate the first stream and the second stream, perform HEVC decoding on the first stream to generate the first decoded right image, and perform SHVC decoding on the second stream to generate the decoded left image.

The encoding processor may be configured to perform video enhancement information (VEI) encoding on the decoded left image, the first decoded right image, and the original right image to generate the third stream, and perform VEI decoding on an input of the third stream, the decoded left image, and the first decoded right image to generate the second decoded right image.

The encoding processor may be configured to perform SHVC encoding on the original right image and the second decoded right image to generate the fourth stream.

The encoding processor may be configured to use -ibl option within the SHVC when decoding the fourth stream such that the first stream may be prevented from being encoded and is used as a prediction signal for encoding the second stream.

The first stream may be a base layer (BL), the second stream may be an enhancement layer (EL), the third stream may be video enhancement information (VEI), and the fourth stream may be generated by performing SHVC encoding on the original right image and the second decoded right image.

According to an aspect of the present invention, there is provided a method for image encoding, the method including: generating, by an encoding processor, a first stream and a second stream from a left image and a down-converted right image, and decoding the first stream and the second stream to generate a decoded left image and a first decoded right image; generating, by the encoding processor, a third stream from the decoded left image, the first decoded right image, and an original right image, and decoding the third stream to generate a second decoded right image; and generating, by the encoding processor, a fourth stream from the second decoded right image and the original right image.

The generating of the decoded left image and the first decoded right image may include performing, by the encoding processor, scalable high efficiency video coding (SHVC) encoding on an input of the left image and the down-converted right image to generate the first stream and the second stream, performing HEVC decoding on the first stream to generate the first decoded right image, and performing SHVC decoding on the second stream to generate the decoded left image.

The decoding of the third stream to generate the second decoded right image may include: performing, by the encoding processor, video enhancement information (VEI) encoding on the decoded left image, the first decoded right image, and the original right image to generate the third stream; and performing VEI decoding on an input of the third stream, the decoded left image, and the first decoded right image to generate the second decoded right image.

The generating of the fourth stream may include performing, by the encoding processor, SHVC encoding on the original right image and the second decoded right image to generate the fourth stream.

The generating of the fourth stream may include using, by the encoding processor, -ibl option within the SHVC when decoding the second stream such that the first stream is prevented from being encoded and is used as a prediction signal for encoding the second stream.

The first stream may be a base layer (BL), the second stream may be an enhancement layer (EL), the third stream may be video enhancement information (VEI), and the fourth stream may be generated by performing SHVC encoding on the original right image and the second decoded right image.

According to an aspect of the present invention, there is provided an apparatus for image decoding, the apparatus including: a receiver memory configured to store a program for encoding a stereoscopic 3D image; and a decoding processor configured to execute the program stored in the receiver memory, wherein the decoding processor is configured to: decode a first stream to generate a right image for mobile broadcasting; decode a second stream using the right image for mobile broadcasting to generate a left image for terrestrial broadcasting; decode a third stream using the right image for mobile broadcasting and the left image for terrestrial broadcasting to generate a right image with an image quality asymmetric to the left image for terrestrial broadcasting; and decode a fourth stream using the right image with the asymmetric image quality to generate a right image with an image quality symmetric to the left image for terrestrial broadcasting.

The decoding processor may be configured to use -ibl option to decode the second stream, and the -ibl option may allow the first stream to be used as a prediction signal for encoding the second stream without being encoded.

The first stream may be a base layer (BL), the second stream may be an enhancement layer (EL), the third stream may be video enhancement information (VEI), the fourth stream may be generated by performing SHVC encoding on an original right image and a second decoded right image, and the second decoded right image may be generated by decoding the third stream, which may be generated from a decoded left image and a first decoded right image, which may be generated by decoding the first stream and the second stream, and the original right image.

According to an aspect of the present invention, there is provided a method for image decoding, the method including: decoding, by a decoding processor, a first stream to generate a right image for mobile broadcasting; decoding, by the decoding processor, a second stream using the right image for mobile broadcasting to generate a left image for terrestrial broadcasting; decoding, by the decoding processor, a third stream using the right image for mobile broadcasting and the left image for terrestrial broadcasting to generate a right image with an image quality asymmetric to the left image for terrestrial broadcasting; and decoding, by the decoding processor, a fourth stream using the right image with the asymmetric image quality to generate a right image with an image quality symmetric to the left image for terrestrial broadcasting.

The generating of the left image for terrestrial broadcasting may include using, by the decoding processor, -ibl option to decode the second stream, wherein the -ibl option may allow the first stream to be used as a prediction signal for encoding the second stream without being encoded.

The first stream may be a base layer (BL), the second stream may be an enhancement layer (EL), the third stream may be video enhancement information (VEI), the fourth stream may be generated by performing SHVC encoding on an original right image and a second decoded right image, and the second decoded right image may be generated by decoding the third stream, which may be generated from a decoded left image and a first decoded right image, which may be generated by decoding the first stream and the second stream, and the original right image.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, an apparatus and method for image encoding according to embodiments of the present invention will be described in detail with reference to the accompanying drawings. The thickness of each line or the size of each component shown in the drawings may be exaggerated for the purposes of clarity and convenience. Although terms used herein are selected from among general terms that are currently widely used in consideration of functions in the exemplary embodiments, these may be changed according to intentions or customs of those skilled in the art or the advent of new technology. Therefore, the meanings of the terms used herein should be interpreted based on substantial meanings of the terms and content of this entire specification, rather than simply the terms themselves.

Hereinafter, embodiments of the present invention will be described in detail with reference to the accompanying drawings to enable those skilled in the art to easily practice the present disclosure. However, the present disclosure may be embodied in various ways, and is not to be construed as limited to the embodiments set forth herein. In the description of the embodiments, detailed descriptions of related known techniques will be omitted to avoid obscuring the subject matter of the present disclosure. Throughout the specification, like reference numerals refer to substantially like elements.

The terms "comprises," "comprising," "includes," and/or "including" used herein specify the presence of stated features, integers, steps, operations, elements, components and/or groups thereof and do not preclude the presence or addition of one or more other features, integers, steps, operations, elements, components, and/or groups thereof unless the context clearly indicates otherwise.

The implementations described herein may be implemented in, for example, a method or process, an apparatus, a software program, a data stream, or a signal. Even when only discussed in the context of a single form of implementation (for example, discussed only as a method), the implementation of features discussed may also be implemented in other forms (for example, an apparatus or program). An apparatus may also be implemented in appropriate hardware, software, and firmware. The methods may be implemented in, for example, an apparatus such as a processor, which is a general term for a processing device, such as a computer, a microprocessor, an integrated circuit, or a programmable logic device.

Figure 1:
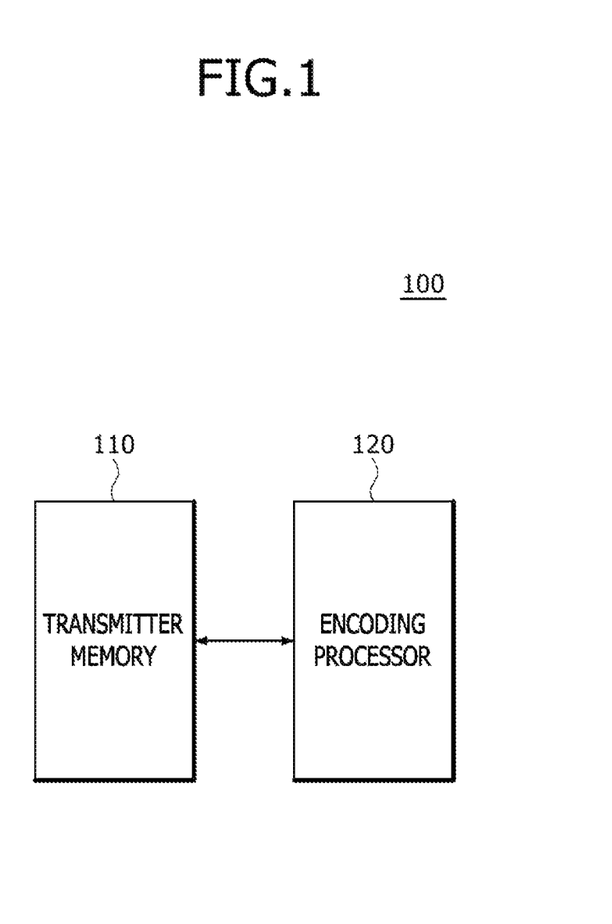
FIG. 1 is a block diagram illustrating an apparatus for image encoding according to an embodiment of the present invention.

FIG. 1 is a block diagram illustrating an apparatus for image encoding according to an embodiment of the present invention.

In the present embodiment, a stereoscopic 3-dimensional (S3D) image is used as an input for scalable high efficiency video coding (SHVC).

The right view image is a base layer (BL) (high definition (HD)), the left view image is an enhancement layer (EL) (ultra-high definition (UHD)), and the right and left view images are entered as input into SHVC.

A BL image, which has a low resolution, may be used as a receivable stream in a mobile device and the like.

An EL image, which has a large resolution, may be used in terrestrial television (TV) and the like.

In addition, when the BL and EL are allowed to have the same resolution through upscaling of the BL, synthesizing the BL and the EL may enable S3D image service with a UHD resolution.

Referring to FIG. 1, an apparatus 100 for image encoding according to an embodiment of the present invention includes a transmitter memory 110 and an encoding processor 120.

The transmitter memory 110 stores a program for encoding an S3D image.

The encoding processor 120 executes the program stored in the transmitter memory 110.

The encoding processor 120 generates a first stream and a second stream from a left image and a down-converted right image.

The encoding processor 120 decodes the generated first stream and the generated second stream to generate a decoded left image and a first decoded right image, and generates a third stream from the decoded left image, the first decoded right image, and an original right image.

The encoding processor 120 decodes the generated third stream to generate a second decoded right image, and generates a fourth stream using the second decoded right image and the original right image.

The encoding processor 120 transmits the generated first to fourth streams to an apparatus 200 for image decoding.

The first stream is a base layer (BL).

The second stream is an enhancement layer (EL).

The third stream is video enhancement information (VEI).

The fourth stream is generated by performing SHVC encoding on the original right image and the second decoded right image. The second decoded right image is described below.

Figure 2:
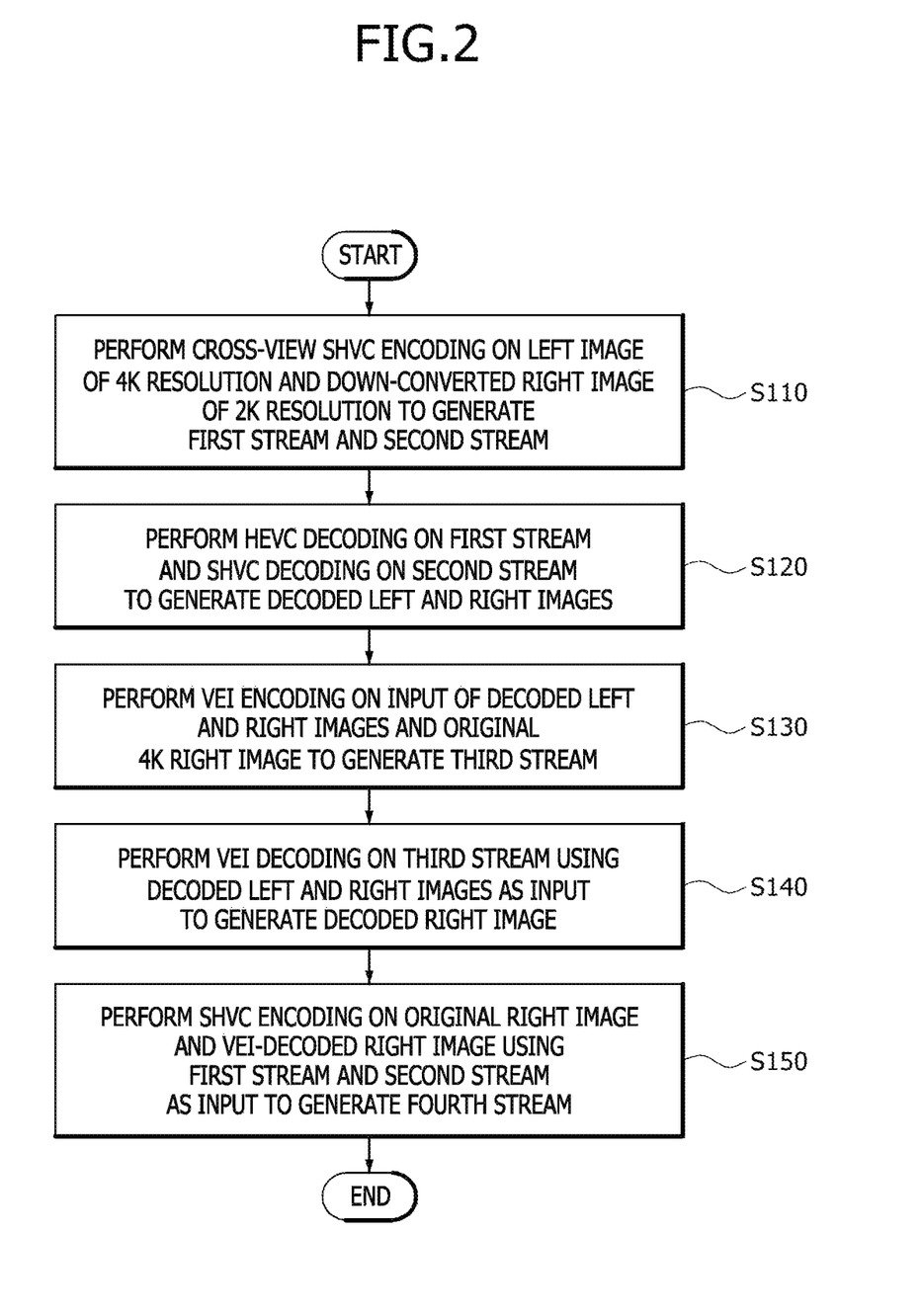
FIG. 2 is a flowchart showing a method for image encoding according to an embodiment of the present invention.
Figure 3:
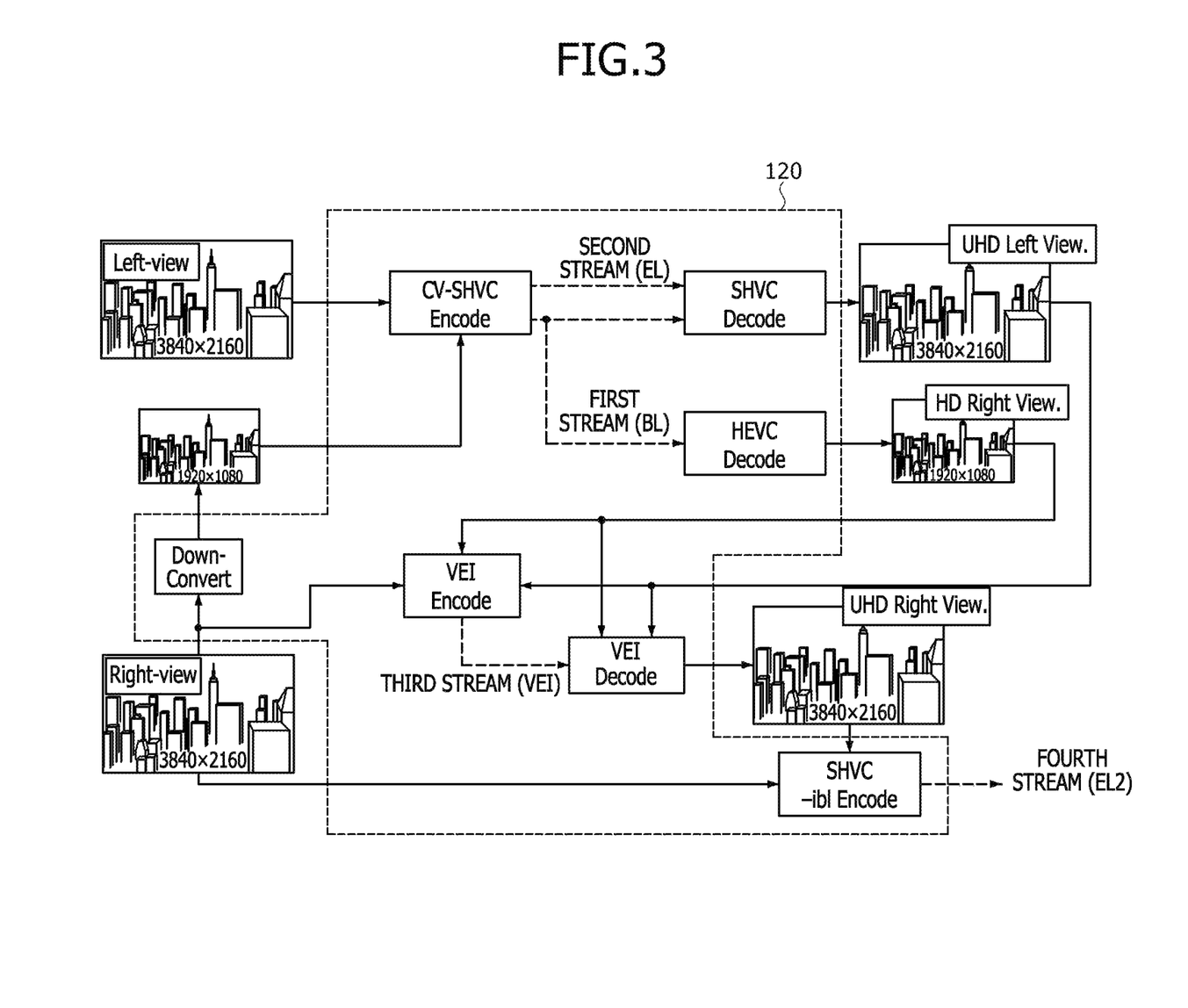
FIG. 3 is a schematic diagram illustrating a method for image encoding according to an embodiment of the present invention.

FIG. 2 is a flowchart showing a method for image encoding according to an embodiment of the present invention. FIG. 3 is a schematic diagram illustrating a method for image encoding according to an embodiment of the present invention.

Referring to FIGS. 2 and 3, first, the encoding processor 120 down-converts a right image.

The encoding processor 120 performs cross-view SHVC encoding on a left image of a 4K resolution and the down-converted right image of a 2K resolution to generate a first stream and a second stream (S110).

In SHVC, when encoding a single frame of the first stream and the second stream of the same time, the first stream is encoded first, and information used during the encoding is not removed but is upscaled to match the frame size of the second stream, and then is transmitted to a process of encoding the second stream. In this case, from the perspective of the second stream, there is an increased amount of reference information available, which enables more efficient encoding.

In other words, SHVC enables efficient encoding for tasks that require different resolutions for the same content image.

Upon the first stream and the second stream being generated, the encoding processor 120 decodes the generated first stream Stream 1 and the generated second stream Stream 2 to generate a first decoded right image and a decoded left image.

In this case, the encoding processor 120 generates the first decoded right image by HEVC decoding the first stream.

In addition, the encoding processor 120 generates the decoded left image by SHVC decoding the second stream (S120).

Here, the first encoding/decoding process in SHVC coincides with the HEVC encoding/decoding process.

Next, the encoding processor 120 performs VEI encoding on input of the decoded left image, the first decoded right image, and the original right image to generate a third stream (S130).

Next, the encoding processor 120 performs VEI decoding on the generated third stream using the decoded left image and the first decoded right image as input, to generate a second decoded right image (S140).

Upon the second decoded right image being generated, the encoding processor 120 performs SHVC encoding on the original right image and the second decoded right image to generate a fourth stream (S150).

In this case, the encoding processor 120 uses the -ibl option within SHVC such that the first stream is not encoded and is used as a prediction signal for encoding the second stream in the decoding process described below.

Here, the -ibl option represents that BL is not encoded and is used only as information for EL encoding in accordance with the purpose of SHVC.

Accordingly, in the apparatus 200 for image decoding, which will be described below, the fourth stream contains encoding information for the EL, and when the fourth stream is restored, only the EL is generated. This will be described below.

The encoding processor 120 transmits the first to fourth streams to the apparatus 200 for image decoding as described above.

Figure 4:
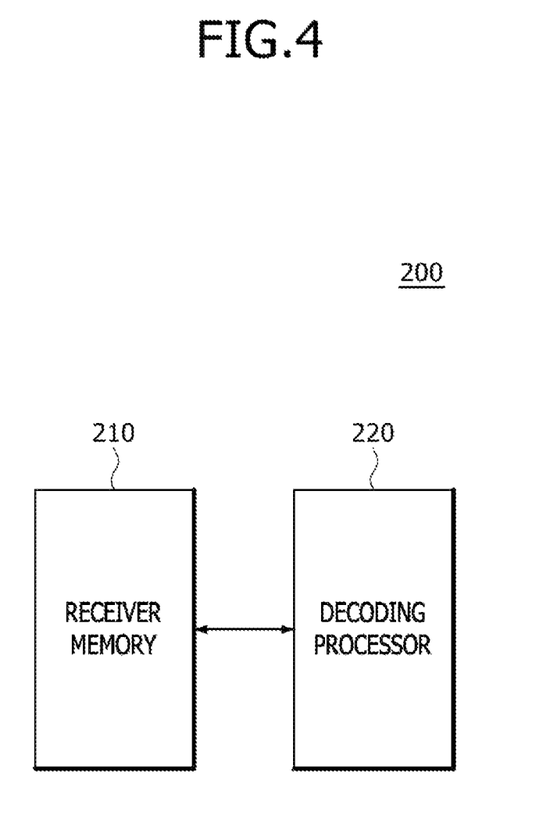
FIG. 4 is a block diagram illustrating an apparatus for image decoding according to an embodiment of the present invention.

FIG. 4 is a block diagram of the apparatus for image decoding according to an embodiment of the present invention.

FIG. 4 is a block diagram illustrating the apparatus for image decoding according to an embodiment of the present invention.

Referring to FIG. 4, the apparatus 200 for image decoding according to an embodiment of the present invention includes a receiver memory 210 and a decoding processor 220.

The receiver memory 210 stores a program for decoding an S3D image.

The decoding processor 220 executes the program stored in the receiver memory 210.

The decoding processor 220 receives the first to fourth streams from the apparatus 100 for image encoding.

The decoding processor 220 generates a right image for mobile broadcasting by decoding the first stream, and generates a left image for terrestrial broadcasting by decoding the second stream using the right image for mobile broadcasting.

The decoding processor 220 decodes the third stream using the right image for mobile broadcasting and the left image for terrestrial broadcasting to generate a right image having an image quality asymmetric to the left image for terrestrial broadcasting.

The decoding processor 220 decodes the fourth stream using the right image with an asymmetric image quality to generate a right image with an image quality symmetric to the left image for terrestrial broadcasting.

Figure 5:
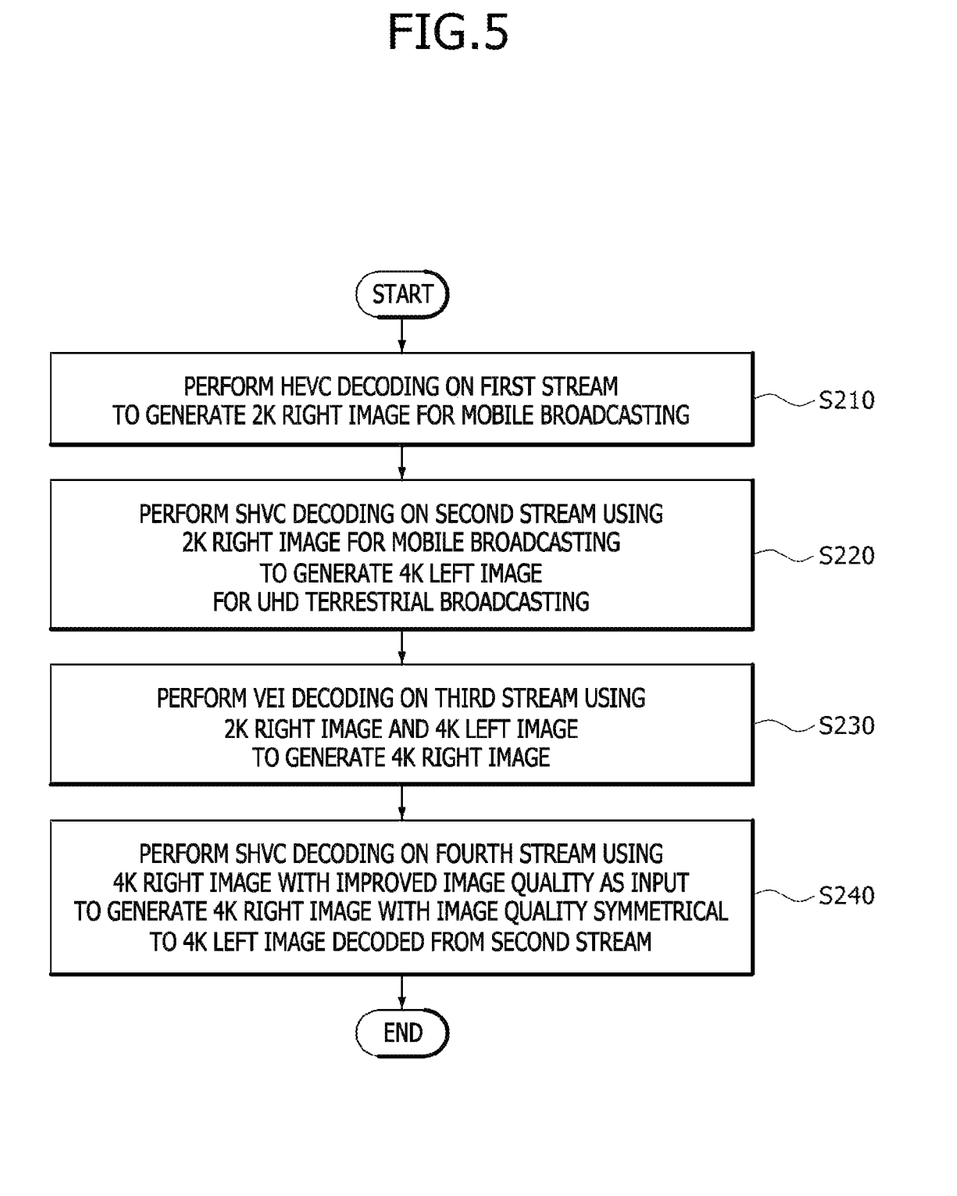
FIG. 5 is a flowchart showing a method for image decoding according to an embodiment of the present invention.
Figure 6:
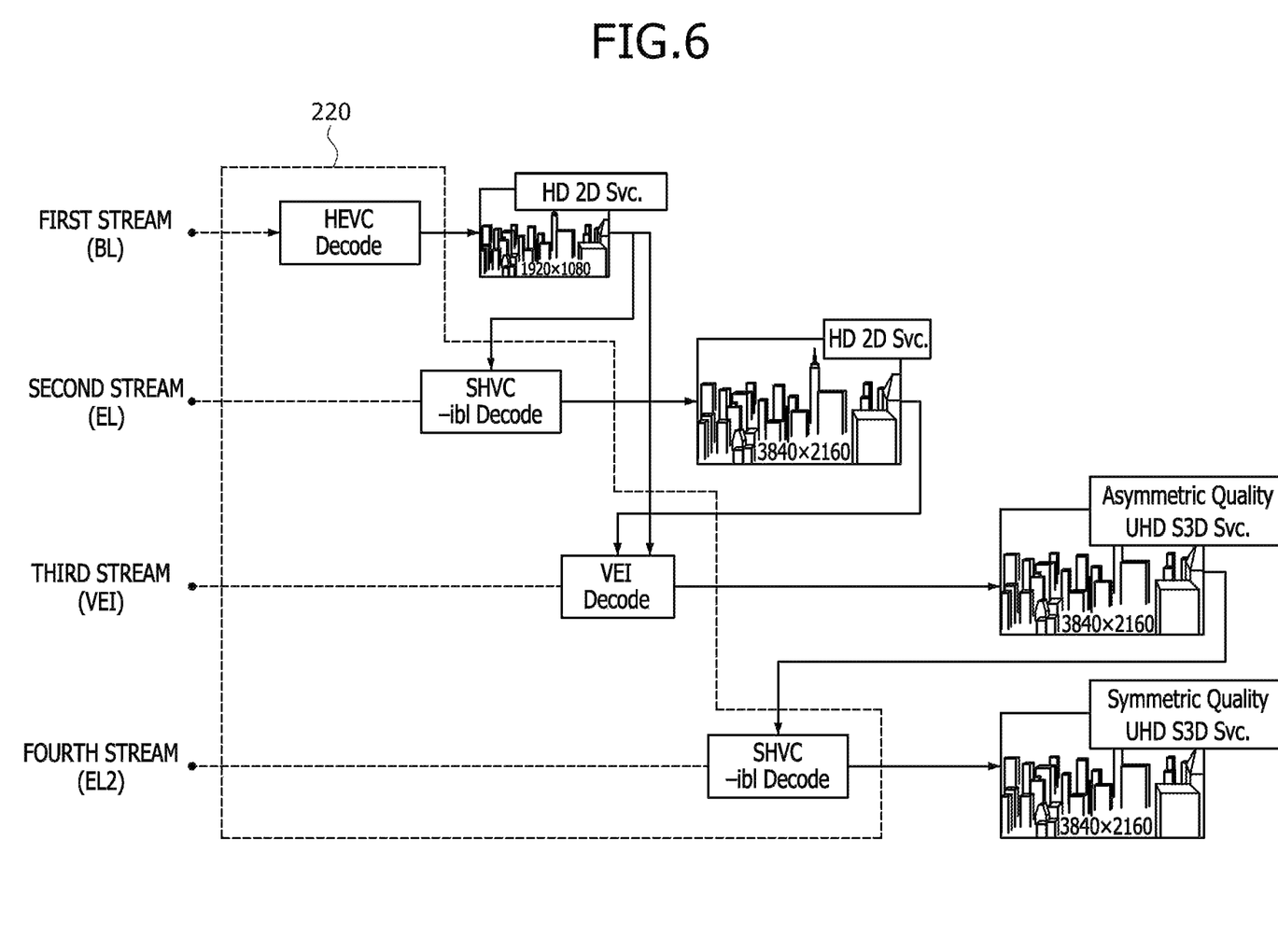
FIG. 6 is a schematic diagram showing a method for image decoding according to an embodiment of the present invention.

FIG. 5 is a flowchart showing a method for image decoding according to an embodiment of the present invention. FIG. 6 is a schematic diagram showing a method for image decoding according to an embodiment of the present invention.

Referring to FIGS. 5 and 6, first, the decoding processor 220 performs HEVC decoding on the first stream to generate a 2K right image for mobile broadcasting (S210).

The decoding processor 220 performs SHVC decoding on the second stream using the generated 2K right image for mobile broadcasting to generate a 4K left image (S220).

In this case, the decoding processor 220 may decode the second stream using the -ibl option. Since the 2K right image has been generated by decoding the first stream, the decoding processor 220 decodes only the 4K left image by referencing the -ibl option.

The 4K left image may be used for UHD terrestrial broadcasting.

Next, the decoding processor 220 decodes the third stream. In this case, the decoding processor 220 performs VEI decoding on the third stream using the 2K right image and the 4K left image to generate a 4K right image (S230).

The 4K right image is a VEI-decoded image of improved image quality and has an asymmetric image quality that is not the same as that of the 4K left image generated from the second stream.

The decoding processor 220 decodes the fourth stream. In this case, the decoding processor 220 performs SHVC decoding on the fourth stream using the right image with an asymmetric image quality, thereby generating a 4K right image with an image quality symmetrical to the 4K left image decoded from the second stream (S240).

Figure 7:
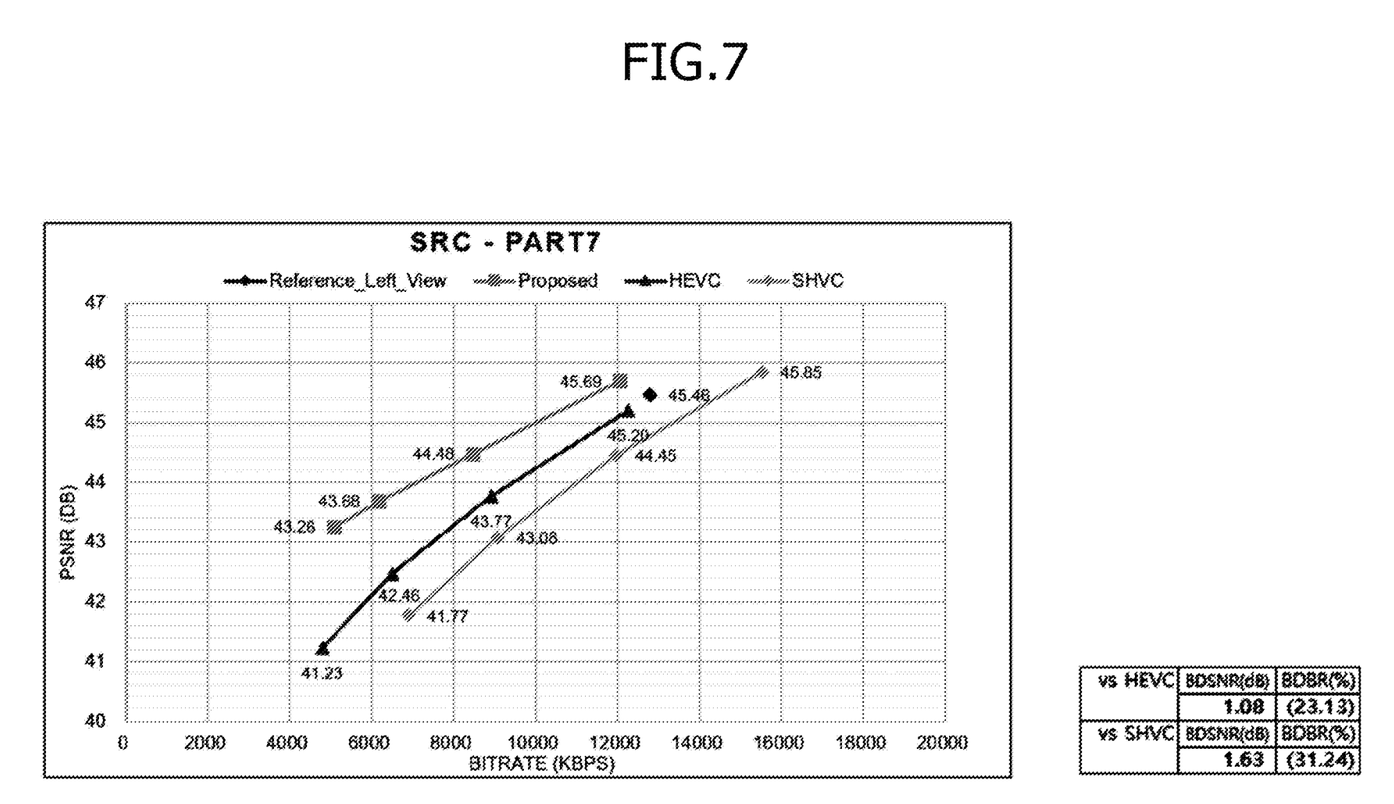
FIG. 7 shows the comparison of rate-distortion (R-D) performance using SRC-Part 7 that is a sequence 4K stereoscopic 3D image according to an embodiment of the present invention.

FIG. 7 shows the comparison of rate-distortion (R-D) performance using SRC-Part 7 that is a sequence 4K S3D image according to an embodiment of the present invention.

In FIG. 7, the result of comparing R-D performance using SRC-Part 7 that is a sequence 4K S3D image, is illustrated, and the comparison references are the standard codecs, that is, HEVC and SHVC encoders.

The method for stereoscopic encoding according to the embodiment achieves the highest peak signal to noise ratio (PSNR) compared to the remaining codecs even when allocated the lowest bits. In addition, it can be seen that the image quality of the Reference Left View image, which is a reference image, is reached the fastest.

Figure 8:
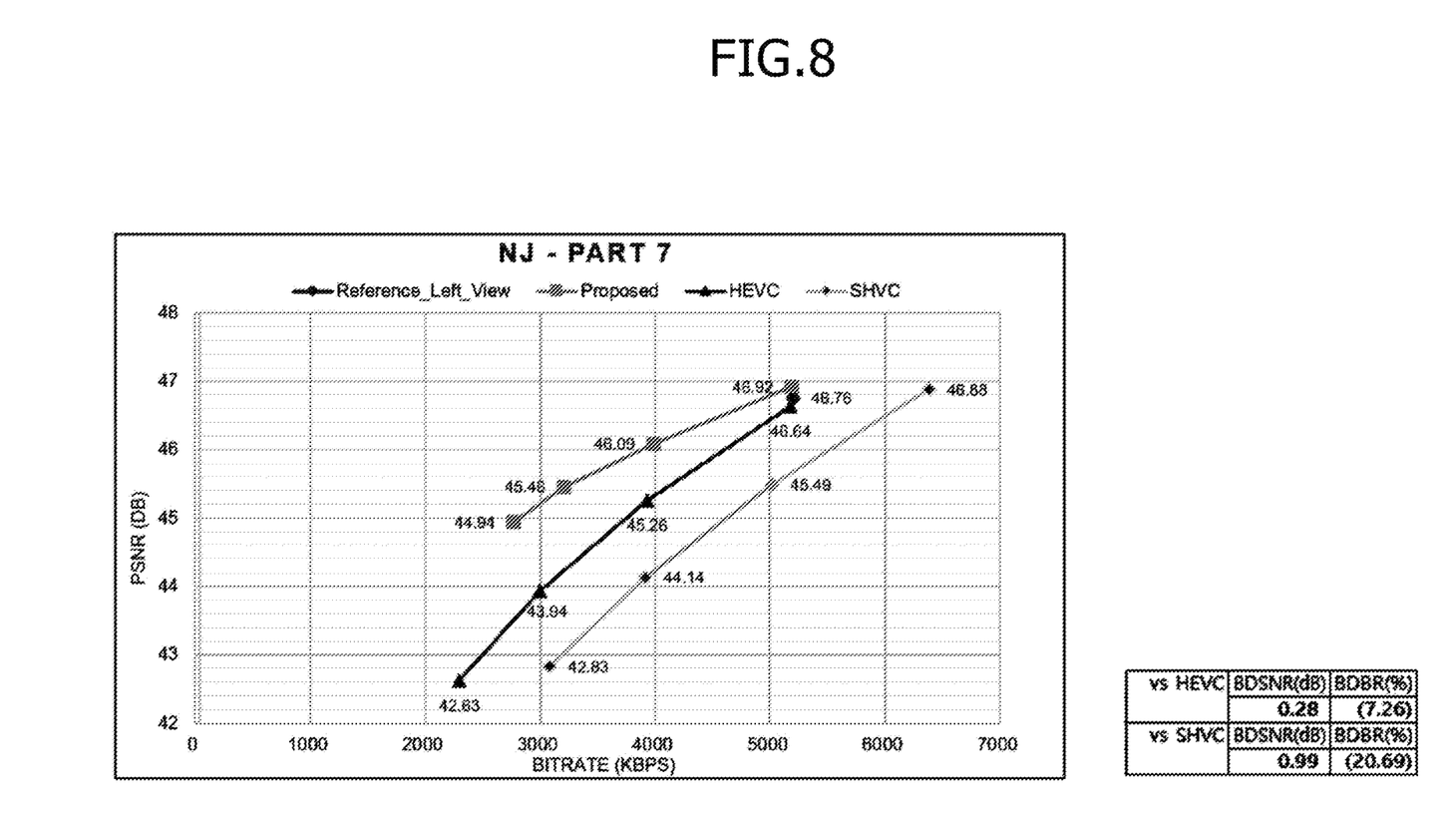
FIG. 8 shows the comparison of R-D performance using NJ-Part 7 that is a sequence 4K stereoscopic 3D image according to an embodiment of the present invention.

FIG. 8 shows the comparison of R-D performance using NJ-Part 7 that is a sequence 4K S3D image according to an embodiment of the present invention.

In FIG. 8, the result of comparing R-D performance using NJ-Part7 that is a sequence 4K S3D image, is illustrated, and the comparison references are the standard codecs, that is, HEVC and SHVC encoders.

The method for stereoscopic encoding according to the embodiment achieves the highest peak signal to noise ratio (PSNR) compared to the remaining codecs even when allocated the lowest bits. In addition, it can be seen that the image quality of the Reference Left View image, which is a reference image, is reached the fastest.

As described above, according to one aspect, the present invention can improve the image quality of a reference image by encoding two enhancement layers (ELs) through a single base layer (BL).

According to another aspect, the present invention can narrow the gap in image quality between binocular images, thereby enabling 3D imaging with binocular image quality that is close to symmetry, and providing an S3D imaging service with excellent viewing quality.

According to another aspect, the present invention can efficiently provide a converged S3D image service and reach the target image quality by utilizing fewer bits in a limited bitrate environment, and thus the gain bitrate can be utilized for improving the image quality of existing 2D-ultra-high definition (UHD) broadcasts.

Although the present invention has been described with reference to embodiments, the embodiments disclosed above should be construed as being illustrative rather than limiting the present invention, and those skilled in the art should appreciate that various substitutions, modifications, and changes are possible without departing from the scope and spirit of the present invention.

Therefore, the scope of the present invention is not defined by the above embodiments but by the appended claims of the present invention.

What is claimed is:

1. An apparatus for image encoding, the apparatus comprising:
   a transmitter memory configured to store a program for encoding a stereoscopic 3D image; and
   an encoding processor configured to execute the program stored in the transmitter memory,
   wherein the encoding processor is configured to:
   generate a first stream and a second stream from a left image and a down-converted right image, decode the first stream and the second stream to generate a decoded left image and a first decoded right image;
   generate a third stream from the decoded left image, the first decoded right image, and an original right image, and decode the third stream to generate a second decoded right image; and
   generate a fourth stream from the second decoded right image and the original right image.

2. The apparatus of claim 1, wherein the encoding processor is configured to:

perform scalable high efficiency video coding (SHVC) encoding on an input of the left image and the down-converted right image to generate the first stream and the second stream;
perform HEVC decoding on the first stream to generate the first decoded right image; and
perform SHVC decoding on the second stream to generate the decoded left image.

3. The apparatus of claim 1, wherein the encoding processor is configured to:
perform video enhancement information (VEI) encoding on the decoded left image, the first decoded right image, and the original right image to generate the third stream; and
perform VEI decoding on an input of the third stream, the decoded left image, and the first decoded right image to generate the second decoded right image.

4. The apparatus of claim 1, wherein the encoding processor is configured to perform SHVC encoding on the original right image and the second decoded right image to generate the fourth stream.

5. The apparatus of claim 4, wherein the encoding processor is configured to use -ibl option within the SHVC when decoding the fourth stream such that the first stream is prevented from being encoded and is used as a prediction signal for encoding the second stream.

6. The apparatus of claim 1, wherein the first stream is a base layer (BL),
the second stream is an enhancement layer (EL),
the third stream is video enhancement information (VEI), and
the fourth stream is generated by performing SHVC encoding on the original right image and the second decoded right image.

7. A method for image encoding, the method comprising:
generating, by an encoding processor, a first stream and a second stream from a left image and a down-converted right image, and decoding the first stream and the second stream to generate a decoded left image and a first decoded right image;
generating, by the encoding processor, a third stream from the decoded left image, the first decoded right image, and an original right image, and decoding the third stream to generate a second decoded right image; and
generating, by the encoding processor, a fourth stream from the second decoded right image and the original right image.

8. The method of claim 7, wherein the generating of the decoded left image and the first decoded right image includes:
performing, by the encoding processor, scalable high efficiency video coding (SHVC) encoding on an input of the left image and the down-converted right image to generate the first stream and the second stream;
performing HEVC decoding on the first stream to generate the first decoded right image; and
performing SHVC decoding on the second stream to generate the decoded left image.

9. The method of claim 7, wherein the decoding of the third stream to generate the second decoded right image includes:
performing, by the encoding processor, video enhancement information (VEI) encoding on the decoded left image, the first decoded right image, and the original right image to generate the third stream; and
performing VEI decoding on an input of the third stream, the decoded left image, and the first decoded right image to generate the second decoded right image.

10. The method of claim 7, wherein the generating of the fourth stream includes performing, by the encoding processor, SHVC encoding on the original right image and the second decoded right image to generate the fourth stream.

11. The method of claim 10, wherein the generating of the fourth stream includes using, by the encoding processor, -ibl option within the SHVC when decoding the second stream such that the first stream is prevented from being encoded and is used as a prediction signal for encoding the second stream.

12. The method of claim 7, wherein the first stream is a base layer (BL),
the second stream is an enhancement layer (EL),
the third stream is video enhancement information (VEI), and
the fourth stream is generated by performing SHVC encoding on the original right image and the second decoded right image.

13. An apparatus for image decoding, the apparatus comprising:
a receiver memory configured to store a program for encoding a stereoscopic 3D image; and
a decoding processor configured to execute the program stored in the receiver memory,
wherein the decoding processor is configured to:
decode a first stream to generate a right image for mobile broadcasting;
decode a second stream using the right image for mobile broadcasting to generate a left image for terrestrial broadcasting;
decode a third stream using the right image for mobile broadcasting and the left image for terrestrial broadcasting to generate a right image with an image quality asymmetric to the left image for terrestrial broadcasting; and
decode a fourth stream using the right image with the asymmetric image quality to generate a right image with an image quality symmetric to the left image for terrestrial broadcasting.

14. The apparatus of claim 13, wherein the decoding processor is configured to use -ibl option to decode the second stream, and
the -ibl option allows the first stream to be used as a prediction signal for encoding the second stream without being encoded.

15. The apparatus of claim 13, wherein the first stream is a base layer (BL),
the second stream is an enhancement layer (EL),
the third stream is video enhancement information (VEI),
the fourth stream is generated by performing SHVC encoding on an original right image and a second decoded right image, and
the second decoded right image is generated by decoding the third stream, which is generated from a decoded left image and a first decoded right image, which are generated by decoding the first stream and the second stream, and the original right image.

16. A method for image decoding, the method comprising:
decoding, by a decoding processor, a first stream to generate a right image for mobile broadcasting;
decoding, by the decoding processor, a second stream using the right image for mobile broadcasting to generate a left image for terrestrial broadcasting;

decoding, by the decoding processor, a third stream using the right image for mobile broadcasting and the left image for terrestrial broadcasting to generate a right image with an image quality asymmetric to the left image for terrestrial broadcasting; and decoding, by the decoding processor, a fourth stream using the right image with the asymmetric image quality to generate a right image with an image quality symmetric to the left image for terrestrial broadcasting.

17. The method of claim 16, wherein the generating of the left image for terrestrial broadcasting includes using, by the decoding processor, -ibl option to decode the second stream, wherein the -ibl option allows the first stream to be used as a prediction signal for encoding the second stream without being encoded.

18. The method of claim 16, wherein the first stream is a base layer (BL), the second stream is an enhancement layer (EL), the third stream is video enhancement information (VEI), the fourth stream is generated by performing SHVC encoding on an original right image and a second decoded right image, and the second decoded right image is generated by decoding the third stream, which is generated from a decoded left image and a first decoded right image, which are generated by decoding the first stream and the second stream, and the original right image.

* * * * *